United States Patent [19]

Trattner

[11] 3,969,148

[45] July 13, 1976

[54] ADAPTER FOR DRY CELL BATTERIES

[75] Inventor: Burton C. Trattner, Hempstead, N.Y.

[73] Assignee: Albert C. Nolte, Jr., Jericho, N.Y.; a part interest

[22] Filed: May 21, 1975

[21] Appl. No.: 579,632

Related U.S. Application Data

[63] Continuation of Ser. No. 441,731, March 13, 1974, abandoned, which is a continuation of Ser. No. 321,610, Jan. 8, 1973, abandoned, which is a continuation of Ser. No. 135,289, April 19, 1971, abandoned.

[52] U.S. Cl. ............................... 136/173; 136/181
[51] Int. Cl.² ......................................... H01M 2/10
[58] Field of Search ............................ 136/173, 181

[56] References Cited
UNITED STATES PATENTS

| | | | |
|---|---|---|---|
| 2,451,726 | 10/1948 | Fry | 136/173 |
| 2,818,463 | 12/1957 | Parker | 136/173 |
| 3,209,230 | 9/1965 | Mas | 136/173 |
| 3,301,712 | 1/1967 | Bach | 136/173 |
| 3,684,583 | 8/1972 | Lehnen et al. | 136/173 |

OTHER PUBLICATIONS

Edmund Scientific Co., Catalog 711 issued Sept., 1970, pp. 3 and 70.

*Primary Examiner*—Donald L. Walton
*Attorney, Agent, or Firm*—Nolte and Nolte

[57] ABSTRACT

An adapter to fit a dry cell battery of a first nominal size for use interchangeably with a dry cell battery of a second and larger nominal size, has a central passage within which the first battery is snugly received and has external dimensions resembling those of a battery of the second nominal size.

4 Claims, 3 Drawing Figures

U.S. Patent July 13, 1976 3,969,148
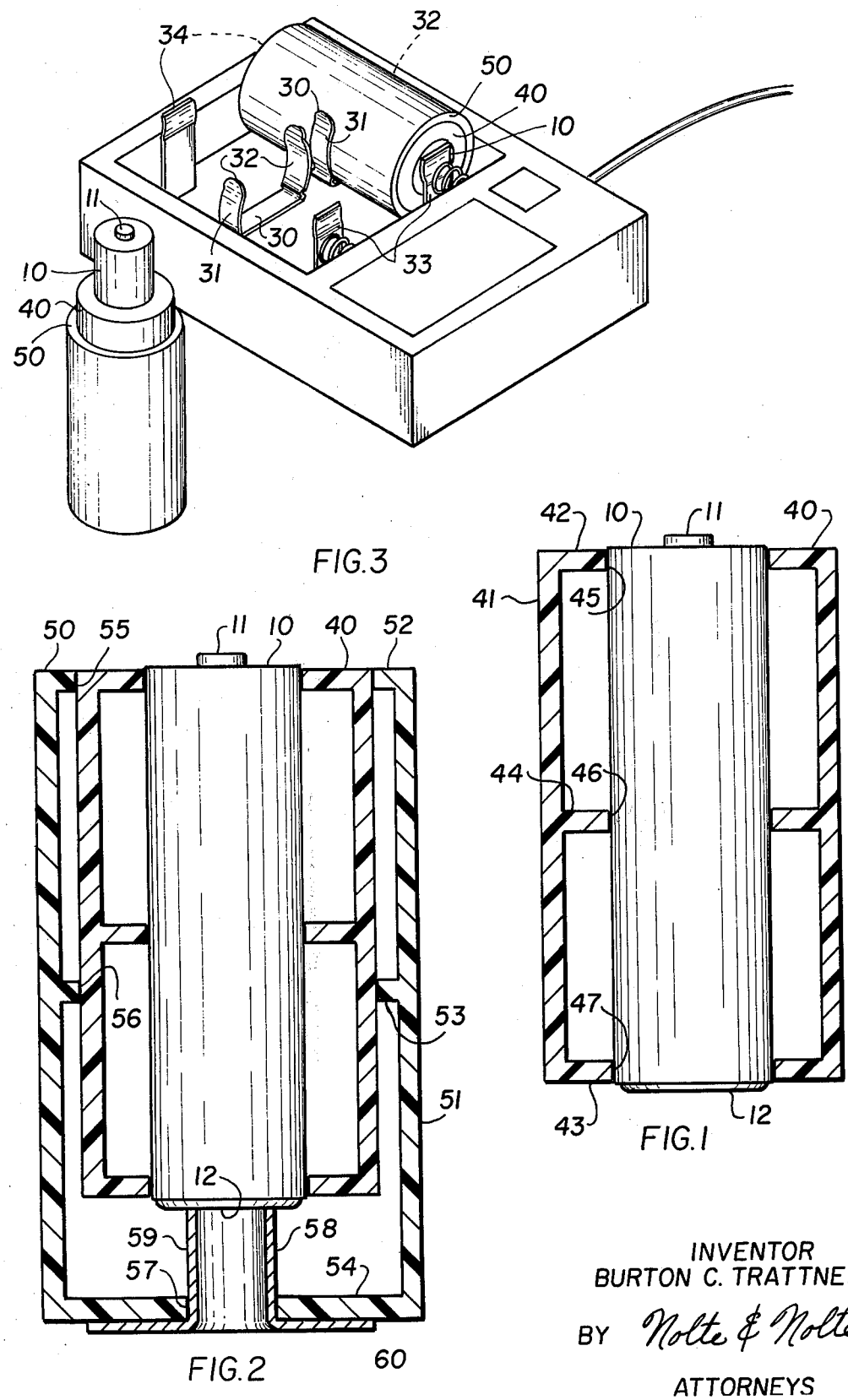
INVENTOR
BURTON C. TRATTNER
BY Nolte & Nolte
ATTORNEYS

ADAPTER FOR DRY CELL BATTERIES

This application is a continuation of application Ser. No. 441,731 filed Mar. 13, 1974, now abandoned; which is a continuation of application Ser. No. 321,610 filed Jan. 8, 1973, now abandoned; which is a continuation of application Ser. No. 135,289 filed Apr. 19, 1971, now abandoned.

BACKGROUND OF THE INVENTION

This invention is concerned with an adapter to enable a dry cell battery to be used in an application in which it might be charging or discharging for which it is electrically acceptable but for which it is physically too small.

Batteries in flash lights, portable radios or so called chargers and other equipment are usually supported in a tube or clips or other mechanical contrivances so that they are securely held in electrical contact with the terminals of the circuit or element which they are to supply or from which they are to be supplied (charged). The support means may hold a single battery between the terminals or a plurality of batteries in end to end relationship may be so held but almost always the support means are arranged to receive a battery of particular transverse cross sectional dimensions.

As is well known, there are generally available several differently dimensioned batteries which have similar electrical discharge and charging characteristics. It frequently occurs than when a physically large battery is needed there is available only a battery of a smaller size but one which is electrically acceptable.

Further, as batteries are reduced in size with advancing technology, it becomes technically and economically desirable to use the new and smaller batteries in equipment designed specifically to receive older and larger batteries. For example, a nickel/cadmium AA battery has similar electrical discharge characteristics to a zinc/carbon D battery but of course as it is rechargeable it is desirable to be able to use such a battery in place of the larger zinc/carbon battery.

Major differences between existing large and small batteries is their working lives. Many pieces of equipment such as, for example, flash lights are designed to receive large batteries that fit them for long and continuous use but in practice those pieces of equipment may be used for only short periods with long intervals of non-use between those periods. During those periods of non-use the battery deteriorates or, because of faulty terminals in the equipment, discharges. In many cases these long periods of non-use can be foreseen but because of the physical design characteristics of the pieces of equipment one is obliged to use a large and expensive battery knowing that were its use physically possible a small, cheaper battery having a shorter working life would be quite adequate.

BRIEF SUMMARY OF THE INVENTION

It is an object of this invention to provide a device which may be used to adapt a battery of lesser transverse cross sectional dimensions for use in an application designed to receive a battery of larger transverse cross sectional dimensions or an application designed to receive a battery of greater length and larger transverse cross sectional dimensions.

BRIEF DESCRIPTION OF THE DRAWINGS

In the Drawings:

An embodiment of this invention is illustrated in the accompanying drawings in which:

FIG. 1 is a cross sectional view of a battery and adapter according to this invention;

FIG. 2 is an axial cross sectional view of a modification of the arrangement shown in FIG. 1; and FIG. 3 is a perspective view of the battery, adapter and charger combination of the invention.

DESCRIPTION OF A PREFERRED EMBODIMENT

In FIG. 1 and 2 of the drawing the battery is indicated generally at 10 and the adapter at 40. The battery is quite conventional having a protruding positive electrode 11 at one end and having a base 12 at its opposite end serving as a negative electrode. The battery is of cylindrical shape having a nominal transverse cross section and a nominal length between its positive and negative electrodes. It may be of any type such as zinc/carbon or nickel/cadmium.

The adapter comprises a cylindrical shell 41 having radial annular flanges 42 and 43 at each end and a similar radial and annular flange 44 midway between its ends. In this embodiment, the inner cylindrical surfaces 45, 46 and 47 of the flanges define a central passageway for supporting the battery 10.

The central passageway is a diameter to receive snugly therein the battery 10.

The adapter may be of any convenient insulating material but is preferably of a plastic material such as polystyrene or polyvinylchloride.

The length of the adapter between the flanges 42 and 43 is such that electrical contact between the electrodes of the battery 10 and the terminals of a circuit or element to be supplied by the battery or by which the battery is to be charged may be made. In general this length will be slightly less than the spacing between the electrodes of the battery but sufficient adequately to support the battery firmly in position.

In FIG. 2 there is shown an adapter 50 for fitting the combination of battery and adapter 40 of FIG. 3 for use in an environment specifically designed to receive a battery which is of larger transverse cross section and length than battery 10.

Adapter 50 comprises a cylindrical shell 51 of outside diameter and length equal to that of the battery which is to be replaced by battery 10. It has a short radial and annular flange 52 at that end adjacent to the positive electrode of battery 10, a similar flange 53 intermediate its ends and a longer, radial flange 54 at its end adjacent to the negative terminal of the battery.

The inner cylindrical surfaces 55 and 56 of the flanges 52 and 53 define a central passageway within which the adapter 40 is supported and within the central aperture 57 of flange 54 an insert 58 is fitted. Insert 58 is a metal conductor having a cylindrical portion 59 fitting aperture 57 and extending to the negative electrode of the battery 10 to establish contact therewith and an external radial and annular flange 60 overlying the flange 54 of the adapter to enable contact to be made with the terminal of a circuit to be supplied by the battery.

It will be appreciated that an adapter such as that shown in FIG. 2 and indicated at 60 could be used to adapt a battery of the size of adapter 40.

FIG. 3 shows how a battery may be supported within a piece of equipment to be supplied or specifically, in the illustration, how it may be supported in a charger. The charger has conventional means for supporting a battery of a larger nominal cross section than the battery 10, those means taking the form of a clip 30 which has a pair of resilient arms 31 and 32 between which the battery is held.

Terminals 33 and 34 of the charging circuit have conventional conformations to ensure electrical contact between the battery electrodes and those terminals.

As is apparent in FIG. 3, the battery 10 has a cross section too small to enable it to be supported by the arms of the spring clip. However, when the battery is received within the central passageway of the adapter defined by flanges 42, 43 and 44 and that adapter received within a second adapter 50 as in FIG. 2 which adapter 50 has an external transverse cross section substantially equal to the cross section of the battery for which the spring clip is intended, the battery 10 can be supported by the clip in a position to ensure proper contact between the terminals of the circuit and the electrodes of the battery.

Although in the embodiments of the invention illustrated the adapters are generally cylindrical to facilitate the use of a cylindrical battery as a substitute for a generally cylindrical battery of larger cross section, it is to be appreciated that it is within the scope of this invention to provide an adapter to enable a battery of other than circular cross section to be used as a replacement for a larger cylindrical battery or a battery of other than circular cross section. For example, to fit a rectangular cross section battery to replace a cylindrical battery one could provide a cylindrical adapter having a rectangular central passageway.

The adapter of this invention may be selected to render the combined weight of it and the battery in conjunction with which it is used either greater or lesser than the weight of the battery which it is to replace so that different weight requirements of the apparatus to be served can be accommodated.

Clearly, the particular adapters illustrated in the drawings are especially shaped to be injection molded but it may be desirable to shape them for extrusion. To this end the radial flanges would be replaced by longitudinally extending ribs.

I claim:

1. In combination; a dry cell battery of a first nominal cross section and an adapter to render the battery interchangeable with a battery of a second, larger nominal cross section, said adapter comprising a body having a central passage opening at opposite ends thereof and constituting means for receiving a battery of said first nominal size insertable therein and removable therefrom from both ends of the body, said passage having the battery received therein and said body having at least two internal flanges projecting into said passage, radially innermost surfaces of said flanges being cylindrical and constituting means engaging and supporting said battery, the external transverse dimensions of the body being substantially similar to those of a battery of said second and larger nominal size.

2. In combination; a dry cell battery having positive and negative electrodes at opposite ends and a nominal transverse circular cross section; and an adapter to render the battery useful in an application for which it would otherwise be too small, said adapter comprising a generally tubular body of no greater length than the spacing between the electrodes of the battery, a central, longitudinal passage opening at opposite ends of said body, battery support means within said passage, said support means comprising inwardly directed flanges on said body projecting into said passage and having radially innermost cylindrical surfaces engaging said battery, said body having an external transverse cross section to fit the battery for said application for which it is otherwise too small, said battery being received within said passage and supported by said support means, the electrodes being disposed beyond the ends of the body and said passageway constituting means for receiving said battery said battery being insertable into and removable from each end of said body.

3. The combination of claim 1, wherein said flanges are annular.

4. The combination as claimed in claim 2, wherein said flanges are annular.

* * * * *